(12) United States Patent
Parker et al.

(10) Patent No.: US 10,426,258 B2
(45) Date of Patent: Oct. 1, 2019

(54) SLIDING MECHANISM

(71) Applicant: Safran Seats USA LLC, Gainesville, TX (US)

(72) Inventors: Charles M. Parker, Irvine, CA (US); Romain Tranier, Costa Mesa, CA (US); Reza Mansouri, Costa Mesa, CA (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 15/839,728

(22) Filed: Dec. 12, 2017

(65) Prior Publication Data

US 2019/0008273 A1   Jan. 10, 2019

Related U.S. Application Data

(60) Provisional application No. 62/529,216, filed on Jul. 6, 2017.

(51) Int. Cl.
  *A47B 1/10*   (2006.01)
  *B60N 3/00*   (2006.01)
  *B64D 11/06*  (2006.01)
  *A47B 31/06*  (2006.01)

(52) U.S. Cl.
  CPC ............... *A47B 1/10* (2013.01); *B60N 3/002* (2013.01); *B60N 3/004* (2013.01); *B64D 11/0638* (2014.12); *A47B 31/06* (2013.01)

(58) Field of Classification Search
  CPC ........... A47B 1/10; B60N 3/002; B60N 3/004
  See application file for complete search history.

(56) References Cited

U.S. PATENT DOCUMENTS

| 1,057,072 | A | * | 3/1913 | McKee | ............ | A47B 1/10 |
| | | | | | | 384/17 |
| 1,965,788 | A | * | 7/1934 | Akiyoshi | ............ | B60N 3/004 |
| | | | | | | 296/37.15 |
| 2,723,895 | A | * | 11/1955 | Spector | ............ | A47B 1/10 |
| | | | | | | 312/282 |
| 3,717,111 | A | * | 2/1973 | Volberding | ............ | A47B 5/04 |
| | | | | | | 108/45 |

(Continued)

FOREIGN PATENT DOCUMENTS

| GB | 2302278 | | 1/1997 | | |
| JP | 2001246976 | A * | 9/2001 | ............ | B60N 3/004 |

OTHER PUBLICATIONS

International Patent Application No. PCT/US2018/020643, Invitation to Pay Additional Fees and, Where Applicable, Protest Fee and Partial International Search Report dated Apr. 17, 2018.

(Continued)

*Primary Examiner* — Hanh V Tran
(74) *Attorney, Agent, or Firm* — Kilpatrick Townsend & Stockton LLP

(57) ABSTRACT

A tray table assembly includes a lateral member, at least one pivot arm attached to the lateral member, a sliding mechanism attached to the lateral member, and a tray base attached to the sliding mechanism. The sliding mechanism may include at least one outboard link, at least one pivot link, and at least one rear link. The tray table assembly may include a retracted configuration and an extended configuration.

20 Claims, 4 Drawing Sheets

(56) References Cited

U.S. PATENT DOCUMENTS

| | | | | |
|---|---|---|---|---|
| 3,773,381 | A * | 11/1973 | Brennan | A47C 7/70 108/45 |
| 8,312,819 | B2 * | 11/2012 | Vignal | B64D 11/0638 108/143 |
| 9,027,486 | B1 * | 5/2015 | Berkovitz | B60N 3/002 108/40 |
| 9,144,325 | B1 | 9/2015 | Sousa et al. | |
| 2003/0106469 | A1 * | 6/2003 | Jensen | B60N 3/004 108/44 |
| 2012/0306241 | A1 * | 12/2012 | Winter | B60N 3/002 297/163 |
| 2013/0284074 | A1 * | 10/2013 | Satterfield | A47B 31/06 108/63 |
| 2014/0183910 | A1 * | 7/2014 | Ulbrich-Gasparevic | B60N 3/004 297/135 |
| 2014/0292042 | A1 * | 10/2014 | Stewart | B60N 3/004 297/163 |
| 2015/0061327 | A1 * | 3/2015 | Millan | B60N 3/004 297/163 |
| 2016/0331125 | A1 * | 11/2016 | Banks | A47B 5/006 |
| 2018/0281299 | A1 * | 10/2018 | Maslakow | B29C 65/565 |

OTHER PUBLICATIONS

International Patent Application No. PCT/US2018/020643, International Search Report and Written Opinion dated Jun. 19, 2018.
Sclater, Mechanisms and Mechanical Devices Sourcebook, Fifth Edition, McGraw-Hill, New York, 2011, p. 96-97.

\* cited by examiner

SLIDING MECHANISM

CROSS REFERENCE TO RELATED APPLICATION

This application is related to and claims priority benefit from U.S. Provisional Application No. 62/529,216 ("the '216 application"), filed on Jul. 6, 2017, entitled KINEMATIC MECHANISMS FOR SLIDING FOOD TRAY ASSEMBLY FOR COMMERCIAL AIRCRAFT CLASS SEATS. The '216 application is hereby incorporated in its entirety by this reference.

FIELD OF THE INVENTION

The field of the invention relates to sliding mechanisms for passenger seats in aircraft or the like.

BACKGROUND

In many instances, passenger vehicles, such as aircraft, buses, trains, ships, and automobiles, include passenger seats that are arranged so that each passenger seat, other than the forward-most located passenger seats, faces the back of the next forward passenger seat. The passenger seats may include various movable/deployable components. For example, the passenger seats may include headrests, footrests, and tray tables that are movable relative to the seat. To increase a passenger's comfort, many passenger seat backs rotate between upright and reclined positions.

In some instances, a tray table may be mounted adjacent the back of each passenger seat for use by a passenger in the next aft passenger seat. The tray table is deployed by the passenger to provide a relatively flat surface for eating, working, recreation, or other uses.

In many conventional uses, the tray table may be mounted to the back of each passenger seat via a pair of retractable arms that allow the tray table to be pulled toward the passenger when deployed. However, conventional tray tables typically have poor sliding quality due to problems related to binding of the components operable for the linear sliding of the tray table for deploying/retracting the tray table. These problems may also be present for other components, such as headrests or footrests. For tray tables, binding problems are exacerbated in bi-fold table designs where the length of the contact surface for each slide (relative to the slide housing) is much smaller than the distance between the two slides (on each side of the tray).

As a result, there is a need for new sliding mechanisms based on kinematic analysis that eliminate the binding associated with typical seat components (such as tray tables) and create predictable and smooth sliding action. In addition to reducing binding and poor sliding quality of typical seat components, new sliding mechanisms improve passenger experience due to improved ergonomics, reduce long term maintenance/repair costs, reduce weight, and simplify manufacturing and assembly of the passenger seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a tray table assembly comprises: a lateral member; at least one pivot arm attached to the lateral member; a sliding mechanism attached to the lateral member; and a tray base attached to the sliding mechanism, wherein: the sliding mechanism comprises at least one outboard link, at least one pivot link, and at least one rear link; and the tray table assembly comprises a retracted configuration and an extended configuration.

In some embodiments, the tray base comprises a bi-fold table.

The sliding mechanism, in certain embodiments, further comprises at least one front link.

In some embodiments, the at least one front link is connected to (i) the at least one pivot link and (ii) the at least one rear link by a pin joint.

In certain embodiments, a first end of the at least one outboard link is attached to the lateral member and a second end of the at least one outboard link is connected to the at least one pivot link by a first pin joint and the at least one rear link is connected to the at least one pivot link by a second pin joint.

In some embodiments, the first pin joint engages a first channel of the tray base and the second pin joint engages a second channel of the tray base.

In the retracted configuration, in certain embodiments, the first pin joint comprises a front position in the first channel, and in the extended configuration, in some embodiments, the first pin joint comprises a rear position in the first channel, wherein the rear position is closer to a rear edge of the tray base compared to the front position.

In certain embodiments, the first channel is approximately perpendicular to the second channel; and the sliding mechanism comprises a transitional condition where the first pin joint is approximately aligned with the second channel such that the at least one pivot link is approximately perpendicular to the at least one outboard link.

The at least one outboard link, in certain embodiments, extends through a rear side of the tray base, and at least one slip joint is disposed adjacent to the at least one outboard link and adjacent to the rear side of the tray base.

According to certain embodiments of the present invention, a sliding mechanism comprises: a left outboard link and a right outboard link; a left pivot link connected to the left outboard link by a first pin joint; a left rear link connected to the left pivot link by a second pin joint; a right pivot link connected to the right outboard link by a third pin joint; and a right rear link connected to the right pivot link by a fourth pin joint, wherein the left rear link and the right rear link are connected to one another by a fifth pin joint.

The sliding mechanism, in certain embodiments, further comprises: a left front link connected to (i) the left pivot link and (ii) the left rear link by the second pin joint; and a right front link connected to (i) the right pivot link and (ii) the right rear link by the fourth pin joint.

In certain embodiments, the left front link and the right front link are connected to one another by a sixth pin joint.

The sliding mechanism, in some embodiments, further comprises a retracted configuration and an extended configuration, wherein movement between the retracted configuration and the extended configuration causes the second pin joint to move in a first direction and the fifth pin joint to move in a second direction that is approximately perpendicular to the first direction.

In some embodiments, the first pin joint engages a first channel; and the third pin joint engages a second channel, wherein the first channel and the second channel are approximately parallel to one another.

The second pin joint and the fourth pin joint, in certain embodiments, each engage a third channel.

In certain embodiments, the fifth pin joint and the sixth pin joint each engage a fourth channel.

In some embodiments, in a retracted configuration, the first pin joint comprises a front position in the first channel; and in an extended configuration, the first pin joint comprises a rear position in the first channel, wherein the rear position is closer to a rear edge of the sliding mechanism compared to the front position.

In certain embodiments, the first channel is approximately perpendicular to the third channel; the sliding mechanism comprises a transitional condition where the first pin joint is approximately aligned with the third channel such that the left pivot link is approximately perpendicular to the left outboard link; and in the transitional condition, the third pin joint is approximately aligned with the third channel such that the right pivot link is approximately perpendicular to the right outboard link.

In some embodiments, to move away from the transitional condition, the second pin joint and the fourth pin joint move away from one another within the third channel.

In certain embodiments, the left outboard link and the right outboard link each extend from a rear side of the sliding mechanism; a first slip joint is disposed adjacent to the left outboard link and adjacent to the rear side of the sliding mechanism; and a second slip joint is disposed adjacent to the right outboard link and adjacent to the rear side of the sliding mechanism.

DETAILED DESCRIPTION

Figure 1A:
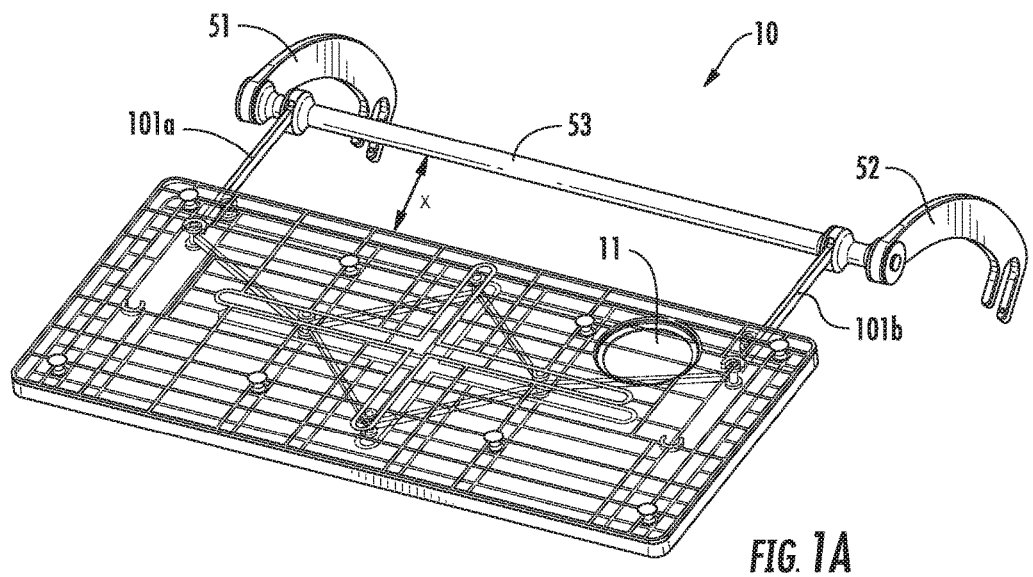
FIG. 1A is a top perspective view of a tray table in an extended configuration for a passenger seat according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-4B illustrate embodiments of tray table assemblies 10 for passenger seats in vehicles such as an aircraft where each tray table assembly 10 includes a left pivot arm 51, a right pivot arm 52, a lateral member 53, and a sliding mechanism 100. In some embodiments, the two pivot arms 51, 52 are attached to the opposing ends of the lateral member 53 and the sliding mechanism 100 is attached to the lateral member 53.

Figure 1B:
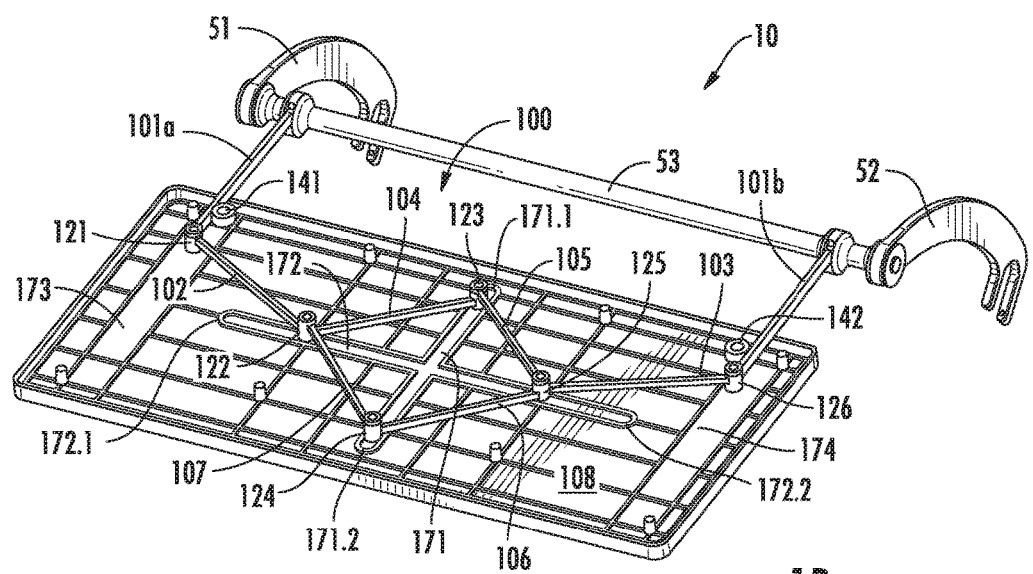
FIG. 1B is a top perspective view of a sliding mechanism of the tray table of FIG. 1A.
Figure 1C:
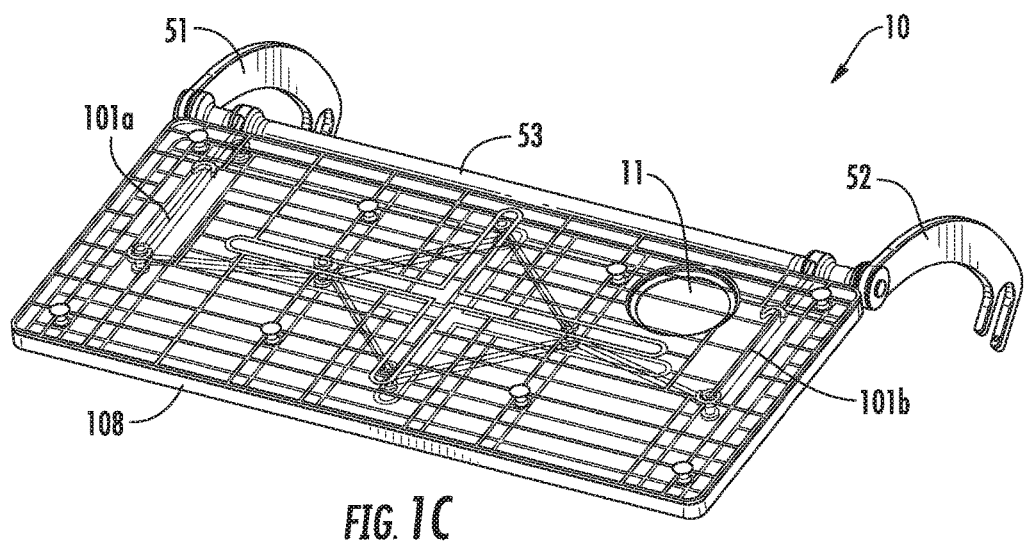
FIG. 1C is a top perspective view of the tray table of FIG. 1A in a retracted configuration.
Figure 2:
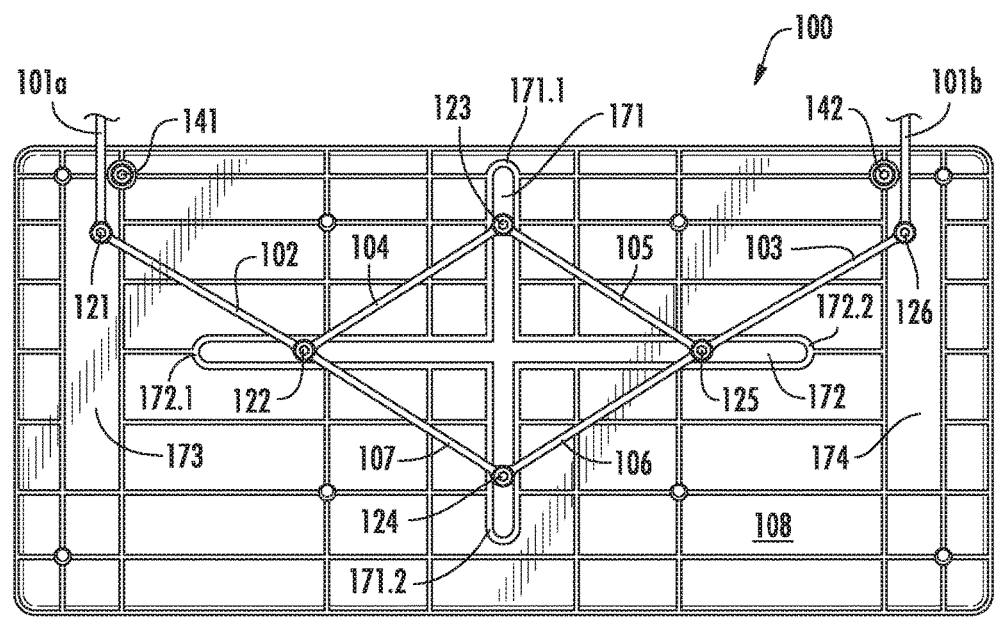
FIG. 2 is a top view of the sliding mechanism of FIG. 1B.

The tray table assembly 10 illustrated in FIGS. 1A-2 includes tray base 108 and a top cover 11. The top cover 11 is transparent in FIGS. 1A and 1C and is not shown in FIGS. 1B and 2. The tray base 108 may include a bi-fold table or table surface. In certain embodiments, the sliding mechanism 100 is a kinematic system with one degree of freedom. Based on the sliding mechanism 100, the tray base 108 and/or top cover 11 can translate relative to the passenger seat (or relative to the pivot arms 51, 52). In some embodiments, based on such translation, the tray table assembly 10 has a retracted configuration (see FIG. 1C) and an extended configuration (see FIG. 1B). In some embodiments, the distance x (see FIG. 1A) between the tray base 108 and the lateral member 53 (and/or the passenger seat) in the extended configuration may be approximately 3". In other embodiments, the distance x may be any appropriate value (greater or less than 3") based on a desired configuration for the tray table assembly 10. To facilitate movement between these configurations, the sliding mechanism 100 uses kinematics to constrain movement of various components. As shown in FIG. 1B, the components of the sliding mechanism 100 may include outboard links 101a and 101b, pivot links 102 and 103, rear links 104 and 105, front links 106 and 107, and a tray base 108. The left outboard link 101a may pass through an opening in the tray base 108 and/or top cover 11 such that the left outboard link 101a may be connected to the left pivot link 102 at pin joint 121. The right outboard link 101b may pass through an opening in the tray base 108 and/or top cover 11 such that the right outboard link 101b may be connected to the right pivot link 103 at pin joint 126. The left pivot link 102 may be connected to (1) the left rear link 104 and (2) the left front link 107 at pin joint 122. The right pivot link 103 may be connected to (1) the right rear link 105 and (2) the right front link 106 at pin joint 125. The left and right rear links 104 and 105 may be connected to one another at pin joint 123. The left and right front links 107 and 106 may be connected to one another at pin joint 124.

The pin joint 121 may engage and/or slide in channel 173 and the pin joint 126 may engage and/or slide in channel 174. For example, the pin joint 121 is shown in a rear position in FIG. 1B when the tray table assembly 10 is in the extended configuration. When the table assembly 10 moves toward the retracted configuration, the pin joint 121 slides toward a front position (shown in FIG. 1C). When the left outboard link 101a and pin joint 121 move relative to channel 173, the sliding mechanism 100 may include at least one slip joint 141 to prevent rotational and/or movement that is not parallel to the length of channel 173. Similarly, the pin joint 126 is shown in a rear position in FIG. 1B when the tray table assembly 10 is in the extended configuration. When the table assembly 10 moves toward the retracted configuration, the pin joint 126 slides toward a front position (shown in FIG. 1C). When the right outboard link 101*b* and pin joint 126 move relative to channel 174, the sliding mechanism 100 may include at least one slip joint 142 to prevent rotational and/or movement that is not parallel to the length of channel 174.

Although a single slip joint 141 on the inboard side of left outboard link 101*a* is shown in FIGS. 1B and 2, the sliding mechanism 100 may include a slip joint 141 on both the outboard and inboard sides of the left outboard link 101*a*. In some embodiments, a single slip joint 141 (adjacent to left outboard link 101*a*) may operate in cooperation with a single slip joint 142 (adjacent to right outboard link 101*b*) such that additional slip joints are not necessary to control translational movement of the outboard links 101*a* and 101*b*. In some embodiments, the slip joints 141, 142 are low friction components, such as bearings. The slip joints 141, 142 may function to prevent excess friction in the mechanism due to non-centered forces applied during movement of the mechanism (i.e., moving between the extended configuration and the retracted configuration).

In some embodiments, the pin joints 122 and 125 may engage and/or slide in channel 172. The channel 172 may be approximately perpendicular to channels 173, 174. The lower portion of the pin joints 122 and 125 may be approximately the same dimension as the width of channel 172 such that movement of the pin joints 122 and 125 is constrained along the length of channel 172. In some embodiments, an end of the channel 172 may dictate the location of the extended configuration and/or the retracted configuration by limiting motion of the pin joints 122 and/or 125. For example, end 172.1 may stop movement of pin joint 122 to constrain the tray base 108 in at least one of the extended configuration and the retracted configuration. In other embodiments, the limits of the sliding mechanism 100 are defined by other components and the pin joint 122 does not reach end 172.1. End 172.2 may stop movement of pin joint 125 to constrain the tray base 108 in at least one of the extended configuration and the retracted configuration. In other embodiments, the limits of the sliding mechanism 100 are defined by other components and the pin joint 125 does not reach end 172.2. Similarly, the pin joints 123 and 124 may engage and/or slide in channel 171. In some cases, channel 171 is approximately perpendicular to channel 172. Channel 171 may be approximately parallel to channels 173, 174. The lower portion of the pin joints 123 and 124 may be approximately the same dimension as the width of channel 171 such that movement of the pin joints 123 and 124 is constrained along the length of channel 171. In some embodiments, an end of the channel 171 may dictate the location of the extended configuration and/or the retracted configuration by limiting motion of the pin joints 123 and/or 124. For example, end 171.1 may stop movement of pin joint 123 to constrain the tray base 108 in at least one of the extended configuration and the retracted configuration. In other embodiments, the limits of the sliding mechanism 100 are defined by other components and the pin joint 123 does not reach end 171.1. End 171.2 may stop movement of pin joint 124 to constrain the tray base 108 in at least one of the extended configuration and the retracted configuration. In other embodiments, the limits of the sliding mechanism 100 are defined by other components and the pin joint 124 does not reach end 171.2.

Movement between the retracted configuration (see FIG. 1C) and the extended configuration (see FIG. 1B) requires translation and rotation of each of links 102-107. During movement of the sliding mechanism 100, between the rear position of the pin joint 121 (FIG. 1B) and the front position of the pin joint 121 (FIG. 1C), the sliding mechanism 100 moves to a transitional condition where the pin joint 121 is approximately aligned with channel 172 such that left pivot link 102 is approximately perpendicular to left outboard link 101*a* (and/or the left pivot link 102 is approximately parallel with the channel 172). This transitional condition locates pin joint 122 at an inboard position (i.e., a maximum distance from end 172.1). The transitional condition also locates pin joint 123 at a rear position (i.e., a position closest to end 171.1) and locates pin joint 124 at a forward position (i.e., a position closest to end 171.2). These movements are mirrored on the other side of the sliding mechanism 100 where, in the transitional condition, the pin joint 126 is approximately aligned with channel 172 such that right pivot link 103 is approximately perpendicular to right outboard link 101*b* (and/or the right pivot link 103 is approximately parallel with the channel 172) and pin joint 125 is located at an inboard position (i.e., a maximum distance from end 172.2). When the sliding mechanism 100 moves away from the transitional condition (either toward the retracted configuration or toward the extended configuration), the pin joints 122 and 125 move outboard away from one another toward the respective ends of the channel(s) (i.e., pin joint 122 moves toward end 172.1 and pin joint 125 moves toward end 172.2) and pin joints 123 and 124 move inboard toward one another.

The links of the sliding mechanism 100 (102-107), in some embodiments, are all equal in length. Further, the links 102-107 may each be identical parts to simplify manufacturing and reduce the number of different parts required for sliding mechanism 100. However, in some embodiments, the links may have different lengths. For example, the sliding mechanism 100 shown in FIGS. 3A and 3B includes links 202-205 having at least two different lengths.

Figure 3A:
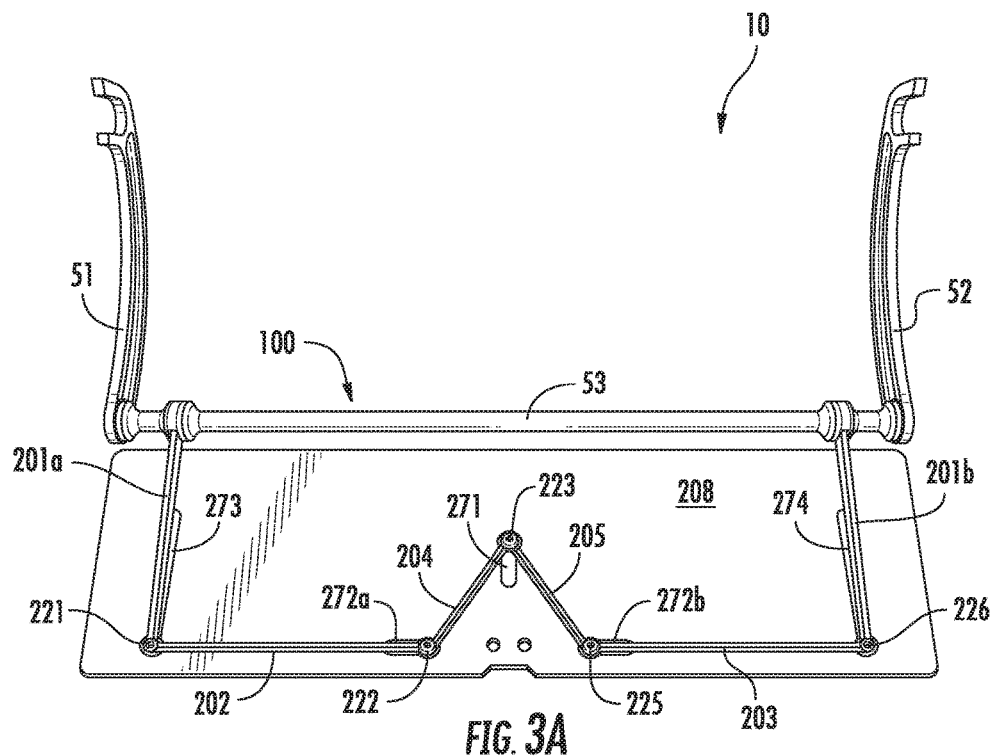
FIG. 3A is a top perspective view of a sliding mechanism of a tray table in an retracted configuration for a passenger seat according to certain embodiments of the present invention.
Figure 3B:
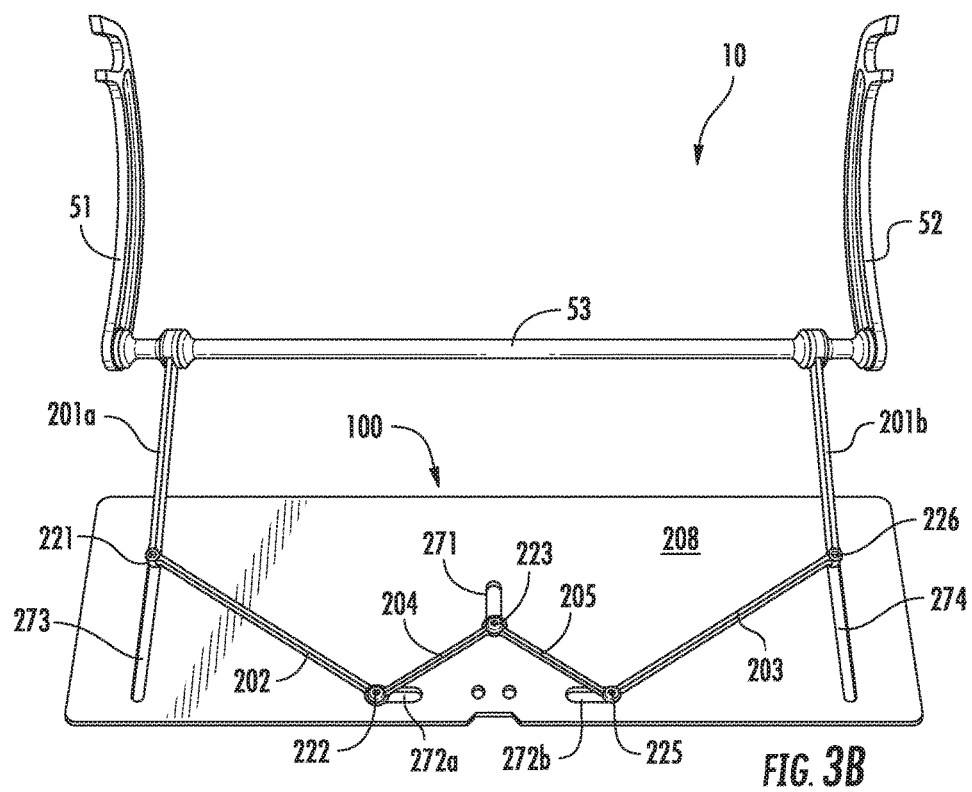
FIG. 3B is a top perspective view of the sliding mechanism of FIG. 3A in an extended configuration.

In some embodiments, the tray table assembly 10 may move between a retracted configuration (see FIG. 3A) and an extended configuration (see FIG. 3B). To facilitate movement between these positions, the sliding mechanism 100 uses kinematics to constrain movement of various components. The components of the sliding mechanism 100 may include outboard links 201*a* and 201*b*, pivot links 202 and 203, rear links 204 and 205, and a tray base 208. The left outboard link 201*a* may be connected to the left pivot link 202 at pin joint 221. The right outboard link 201*b* may be connected to the right pivot link 203 at pin joint 226. The left pivot link 202 may be connected to the left rear link 204 at pin joint 222. The right pivot link 203 may be connected to the right rear link 205 at pin joint 225. The left and right rear links 204 and 205 may be connected to one another at pin joint 223. Movement of the sliding mechanism 100 shown in FIGS. 3A and 3B may be similar to that of the sliding mechanism 100 shown in FIGS. 1A-2 with the omission the front links.

The configuration of sliding mechanism 100 shown in FIGS. 3A and 3B may be appropriate for tray tables with less depth (i.e., a shorter dimension of tray base 208 compared to tray base 108 in the vertical direction shown in FIGS. 2-3B). However the configuration shown in FIGS. 1A-2 may be modified to remove links 106, 107 and pin joint 124 without reducing the size of tray base 108. Furthermore, the configuration of sliding mechanism 100 illustrated in FIGS. 3A and 3B may be modified such that all links (202-205) have equal length.

Figure 4A:
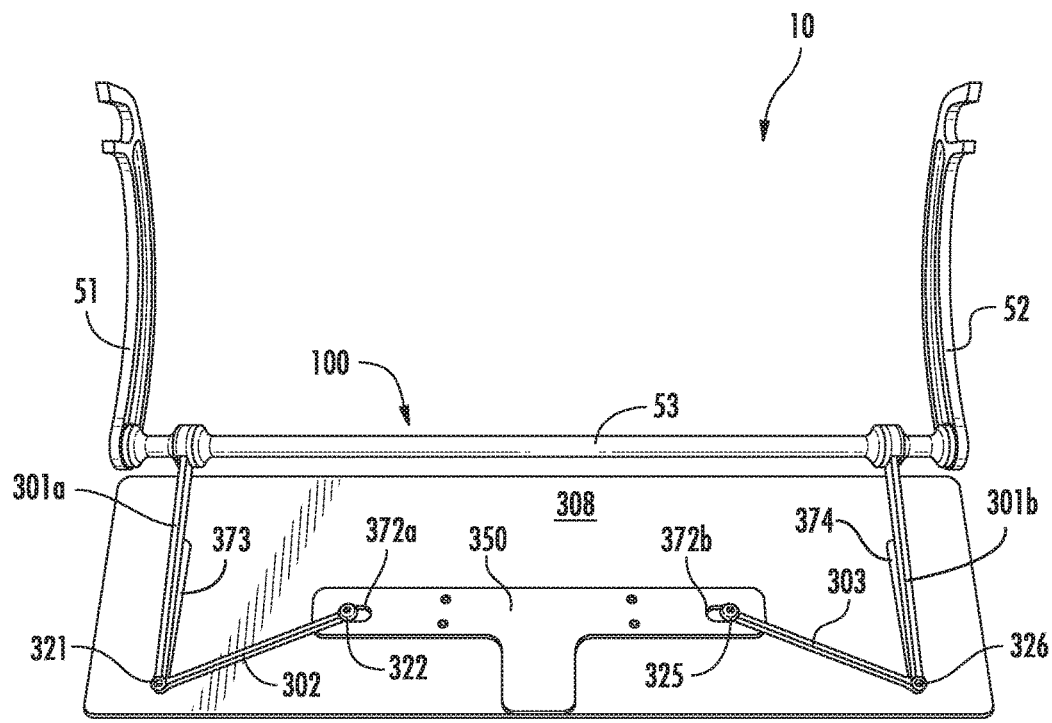
FIG. 4A is a top perspective view of a sliding mechanism of a tray table in an retracted configuration for a passenger seat according to certain embodiments of the present invention.
Figure 4B:
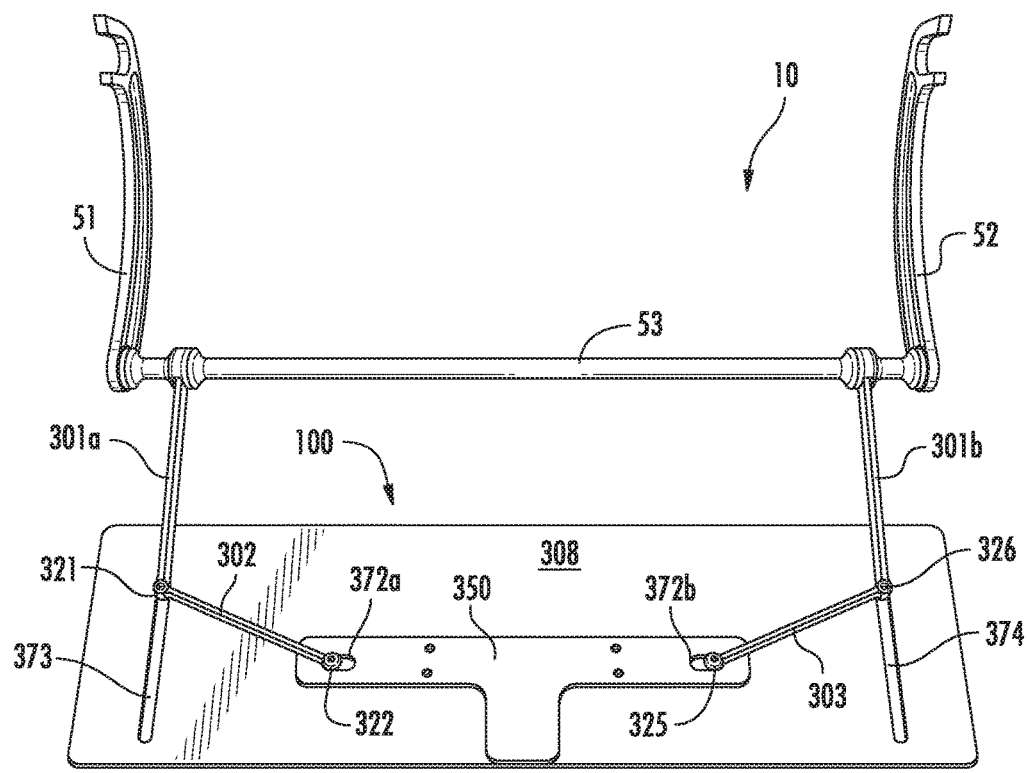
FIG. 4B is a top perspective view of the sliding mechanism of FIG. 4A in an extended configuration.

The tray table assembly 10 may move between a retracted configuration (see FIG. 4A) and an extended configuration (see FIG. 4B). To facilitate movement between these configurations, the sliding mechanism 100 uses kinematics to constrain movement of various components. The components of the sliding mechanism 100 may include outboard links 301a and 301b, pivot links 302 and 303, center plate 350, and a tray base 308. The left outboard link 301a may be connected to the left pivot link 302 at pin joint 321. The right outboard link 301b may be connected to the right pivot link 303 at pin joint 326. The left pivot link 302 may be connected to the center plate 350 at pin joint 322. The right pivot link 303 may be connected to the center plate 350 at pin joint 325. The center plate 350 may be appropriate for tray bases 308 constructed from material incapable of transferring sufficient loads (e.g., thin material and/or materials with reduced structural properties). In some embodiments, the center plate 350 provides structural reinforcement for a feature of the tray table assembly 10 (e.g., a bi-fold hinge). In other words, tray base 308 as shown in the drawings may be half of the total size of the table such that a similar portion of the table may fold from above or below the table as shown (tray base 108 and/or tray base 208 may include similar arrangements). The center plate 350 may be an integral portion of tray base 308 or may be a separate component.

The channels configured to guide movement of the pin joints may extend a sufficient length to engage multiple pin joints (as described above for channels 171, 172). In other embodiments, the channels may be separated for engaging a single pin joint for each channel. For example, as shown in FIGS. 3A and 3B, channel 272a may engage pin joint 222 and channel 272b may engage pin joint 225. In addition, as shown in FIGS. 4A and 4B, channel 372a may engage pin joint 322 and channel 372b may engage pin joint 325.

In some embodiments, the tray table assembly 10 may include at least one tactile component. The at least one tactile component may a component of the sliding mechanism 100 and/or may interface with the sliding mechanism 100. For example, the sliding mechanism 100 may include an arrangement of grooves or splines with corresponding notch(es) for at least one of the pin joints. Such an arrangement may provide audible and/or tactile feedback to a user to signal movement of the tray base, and, in certain embodiments, may increase resistance for movement of the sliding mechanism 100. The arrangement may also facilitate at least one detent for creating predefined positions for the sliding mechanism 100. The at least one tactile component may include a spring and/or a one-way friction clutch. The at least one tactile component may include components for biasing the sliding mechanism 100 toward at least one of the retracted configuration and the extended configuration.

The components of the tray table assembly 10 may be formed of materials including, but not limited to, aluminum, steel, titanium, carbon composite, graphite composite, polyester, nylon, plastic, thermoplastic, other fabric materials, stainless steel, other plastic or polymer materials, other metallic materials, other composite materials, or other similar materials. Moreover, the components of the tray table assembly 10 may be attached to one another via suitable fasteners, which include, but are not limited to, screws, bolts, rivets or other mechanical or chemical fasteners.

In the following, further examples are described to facilitate understanding of aspects of the invention:

Example A

A tray table assembly comprising:
a lateral member;
at least one pivot arm attached to the lateral member;
a sliding mechanism attached to the lateral member; and
a tray base attached to the sliding mechanism, wherein:
the sliding mechanism comprises at least one outboard link, at least one pivot link, and at least one rear link; and
the tray table assembly comprises a retracted configuration and an extended configuration.

Example B

The tray table assembly of Example A or any of the preceding or subsequent examples, wherein the tray base comprises a bi-fold table.

Example C

The tray table assembly of Example A or any of the preceding or subsequent examples, wherein the sliding mechanism further comprises at least one front link.

Example D

The tray table assembly of Example C or any of the preceding or subsequent examples, wherein the at least one front link is connected to (i) the at least one pivot link and (ii) the at least one rear link by a pin joint.

Example E

The tray table assembly of Example A or any of the preceding or subsequent examples, wherein a first end of the at least one outboard link is attached to the lateral member and a second end of the at least one outboard link is connected to the at least one pivot link by a first pin joint and the at least one rear link is connected to the at least one pivot link by a second pin joint.

Example F

The tray table assembly of Example E or any of the preceding or subsequent examples, wherein the first pin joint engages a first channel of the tray base and the second pin joint engages a second channel of the tray base.

Example G

The tray table assembly of Example F or any of the preceding or subsequent examples, wherein:
in the retracted configuration, the first pin joint comprises a front position in the first channel; and
in the extended configuration, the first pin joint comprises a rear position in the first channel, wherein the rear position is closer to a rear edge of the tray base compared to the front position.

Example H

The tray table assembly of Example F or any of the preceding or subsequent examples, wherein:

the first channel is approximately perpendicular to the second channel; and the sliding mechanism comprises a transitional condition where the first pin joint is approximately aligned with the second channel such that the at least one pivot link is approximately perpendicular to the at least one outboard link.

Example I

The tray table assembly of Example A or any of the preceding or subsequent examples, wherein:

the at least one outboard link extends through a rear side of the tray base; and at least one slip joint is disposed adjacent to the at least one outboard link and adjacent to the rear side of the tray base.

Example J

A sliding mechanism comprising:
a left outboard link and a right outboard link;
a left pivot link connected to the left outboard link by a first pin joint;
a left rear link connected to the left pivot link by a second pin joint;
a right pivot link connected to the right outboard link by a third pin joint; and
a right rear link connected to the right pivot link by a fourth pin joint,
wherein the left rear link and the right rear link are connected to one another by a fifth pin joint.

Example K

The sliding mechanism of Example J or any of the preceding or subsequent examples, further comprising:
a left front link connected to (i) the left pivot link and (ii) the left rear link by the second pin joint; and
a right front link connected to (i) the right pivot link and (ii) the right rear link by the fourth pin joint.

Example L

The sliding mechanism of Example K or any of the preceding or subsequent examples, wherein the left front link and the right front link are connected to one another by a sixth pin joint.

Example M

The sliding mechanism of Example J or any of the preceding or subsequent examples, further comprising a retracted configuration and an extended configuration, wherein movement between the retracted configuration and the extended configuration causes the second pin joint to move in a first direction and the fifth pin joint to move in a second direction that is approximately perpendicular to the first direction.

Example N

The sliding mechanism of Example J or any of the preceding or subsequent examples, wherein:
the first pin joint engages a first channel; and
the third pin joint engages a second channel, wherein the first channel and the second channel are approximately parallel to one another.

Example O

The sliding mechanism of Example N or any of the preceding or subsequent examples, wherein the second pin joint and the fourth pin joint each engage a third channel.

Example P

The sliding mechanism of Example L or any of the preceding or subsequent examples, wherein the fifth pin joint and the sixth pin joint each engage a fourth channel.

Example Q

The sliding mechanism of Example N or any of the preceding or subsequent examples, wherein:
in a retracted configuration, the first pin joint comprises a front position in the first channel; and
in an extended configuration, the first pin joint comprises a rear position in the first channel, wherein the rear position is closer to a rear edge of the sliding mechanism compared to the front position.

Example R

The sliding mechanism of Example O or any of the preceding or subsequent examples, wherein:
the first channel is approximately perpendicular to the third channel;
the sliding mechanism comprises a transitional condition where the first pin joint is approximately aligned with the third channel such that the left pivot link is approximately perpendicular to the left outboard link; and
in the transitional condition, the third pin joint is approximately aligned with the third channel such that the right pivot link is approximately perpendicular to the right outboard link.

Example S

The sliding mechanism of Example R or any of the preceding or subsequent examples, wherein, to move away from the transitional condition, the second pin joint and the fourth pin joint move away from one another within the third channel.

Example T

The sliding mechanism of Example J or any of the preceding or subsequent examples, wherein:
the left outboard link and the right outboard link each extend from a rear side of the sliding mechanism;
a first slip joint is disposed adjacent to the left outboard link and adjacent to the rear side of the sliding mechanism; and
a second slip joint is disposed adjacent to the right outboard link and adjacent to the rear side of the sliding mechanism.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited That which is claimed is:

1. A tray table assembly comprising:
    a lateral member;
    at least one pivot arm attached to the lateral member;
    a sliding mechanism attached to the lateral member; and
    a tray base attached to the sliding mechanism, wherein:
    the sliding mechanism comprises at least one outboard link, at least one pivot link, and at least one rear link;
    the tray table assembly comprises a retracted configuration and an extended configuration; and
    a first end of the at least one outboard link is attached to the lateral member and a second end of the at least one outboard link is connected to the at least one pivot link by a first pin joint and the at least one rear link is connected to the at least one pivot link by a second pin joint.

2. The tray table assembly of claim 1, wherein the tray base comprises a bi-fold table.

3. The tray table assembly of claim 1, wherein the sliding mechanism further comprises at least one front link.

4. The tray table assembly of claim 3, wherein the at least one front link is connected to (i) the at least one pivot link and (ii) the at least one rear link by a third pin joint.

5. The tray table assembly of claim 1, wherein the first pin joint engages a first channel of the tray base and the second pin joint engages a second channel of the tray base.

6. The tray table assembly of claim 5, wherein:
    in the retracted configuration, the first pin joint comprises a front position in the first channel; and
    in the extended configuration, the first pin joint comprises a rear position in the first channel, wherein the rear position is closer to a rear edge of the tray base compared to the front position.

7. The tray table assembly of claim 5, wherein:
    the first channel is approximately perpendicular to the second channel; and
    the sliding mechanism comprises a transitional condition where the first pin joint is approximately aligned with the second channel such that the at least one pivot link is approximately perpendicular to the at least one outboard link.

8. The tray table assembly of claim 1, wherein:
    the at least one outboard link extends through a rear side of the tray base; and
    at least one slip joint is disposed adjacent to the at least one outboard link and adjacent to the rear side of the tray base.

9. A sliding mechanism comprising:
    a left outboard link and a right outboard link;
    a left pivot link connected to the left outboard link by a first pin joint;
    a left rear link connected to the left pivot link by a second pin joint;
    a right pivot link connected to the right outboard link by a third pin joint; and
    a right rear link connected to the right pivot link by a fourth pin joint,
    wherein the left rear link and the right rear link are connected to one another by a fifth pin joint.

10. The sliding mechanism of claim 9, further comprising:
    a left front link connected to (i) the left pivot link and (ii) the left rear link by the second pin joint; and
    a right front link connected to (i) the right pivot link and (ii) the right rear link by the fourth pin joint.

11. The sliding mechanism of claim 10, wherein the left front link and the right front link are connected to one another by a sixth pin joint.

12. The sliding mechanism of claim 9, further comprising a retracted configuration and an extended configuration, wherein movement between the retracted configuration and the extended configuration causes the second pin joint to move in a first direction and the fifth pin joint to move in a second direction that is approximately perpendicular to the first direction.

13. The sliding mechanism of claim 9, wherein:
    the first pin joint engages a first channel; and
    the third pin joint engages a second channel, wherein the first channel and the second channel are approximately parallel to one another.

14. The sliding mechanism of claim 13, wherein the second pin joint and the fourth pin joint each engage a third channel.

15. The sliding mechanism of claim 11, wherein the fifth pin joint and the sixth pin joint each engage a fourth channel.

16. The sliding mechanism of claim 13, wherein:
    in a retracted configuration, the first pin joint comprises a front position in the first channel; and
    in an extended configuration, the first pin joint comprises a rear position in the first channel, wherein the rear position is closer to a rear edge of the sliding mechanism compared to the front position.

17. The sliding mechanism of claim 14, wherein:
    the first channel is approximately perpendicular to the third channel;
    the sliding mechanism comprises a transitional condition where the first pin joint is approximately aligned with the third channel such that the left pivot link is approximately perpendicular to the left outboard link; and
    in the transitional condition, the third pin joint is approximately aligned with the third channel such that the right pivot link is approximately perpendicular to the right outboard link.

18. The sliding mechanism of claim 17, wherein, to move away from the transitional condition, the second pin joint and the fourth pin joint move away from one another within the third channel.

19. The sliding mechanism of claim 9, wherein:
    the left outboard link and the right outboard link each extend from a rear side of the sliding mechanism;
    a first slip joint is disposed adjacent to the left outboard link and adjacent to the rear side of the sliding mechanism; and
    a second slip joint is disposed adjacent to the right outboard link and adjacent to the rear side of the sliding mechanism.

20. A tray table assembly comprising:
    a lateral member;
    at least one pivot arm attached to the lateral member;
    a sliding mechanism attached to the lateral member; and
    a tray base attached to the sliding mechanism, wherein:
    the sliding mechanism comprises at least one outboard link, at least one pivot link, at least one rear link, and at least one front link;
    the tray table assembly comprises a retracted configuration and an extended configuration; and
    the at least one front link is connected to (i) the at least one pivot link and (ii) the at least one rear link by a pin joint.

* * * * *